Figure 1:
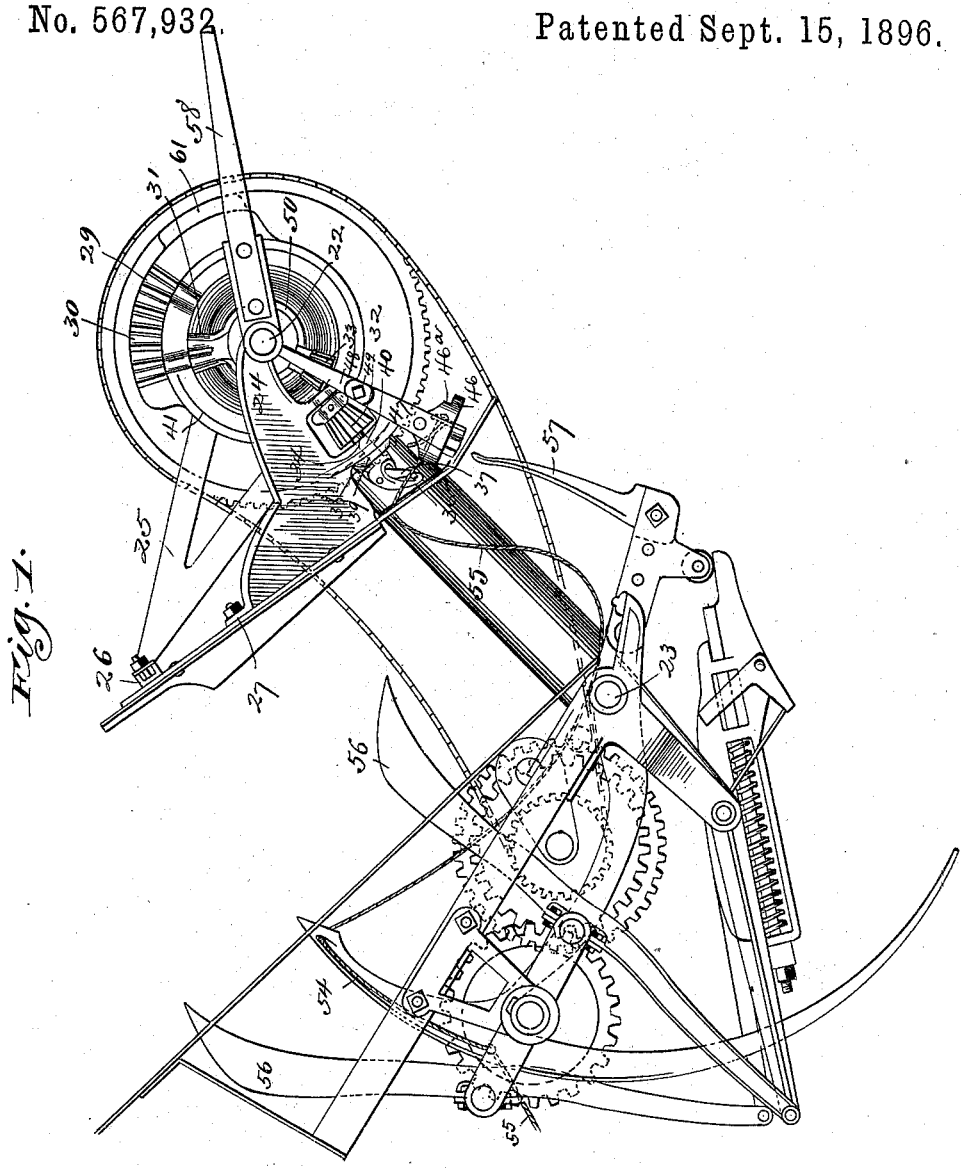

(No Model.) 4 Sheets—Sheet 1.

J. F. APPLEBY.
KNOTTING MECHANISM FOR AUTOMATIC GRAIN BINDERS.

No. 567,932. Patented Sept. 15, 1896.

Witnesses,
F. J. Mann
F. B. Goodwin

Inventor,
John F. Appleby
By Offield, Towle & Linthicum,
Attys.

(No Model.) 4 Sheets—Sheet 2.
J. F. APPLEBY.
KNOTTING MECHANISM FOR AUTOMATIC GRAIN BINDERS.
No. 567,932. Patented Sept. 15, 1896.
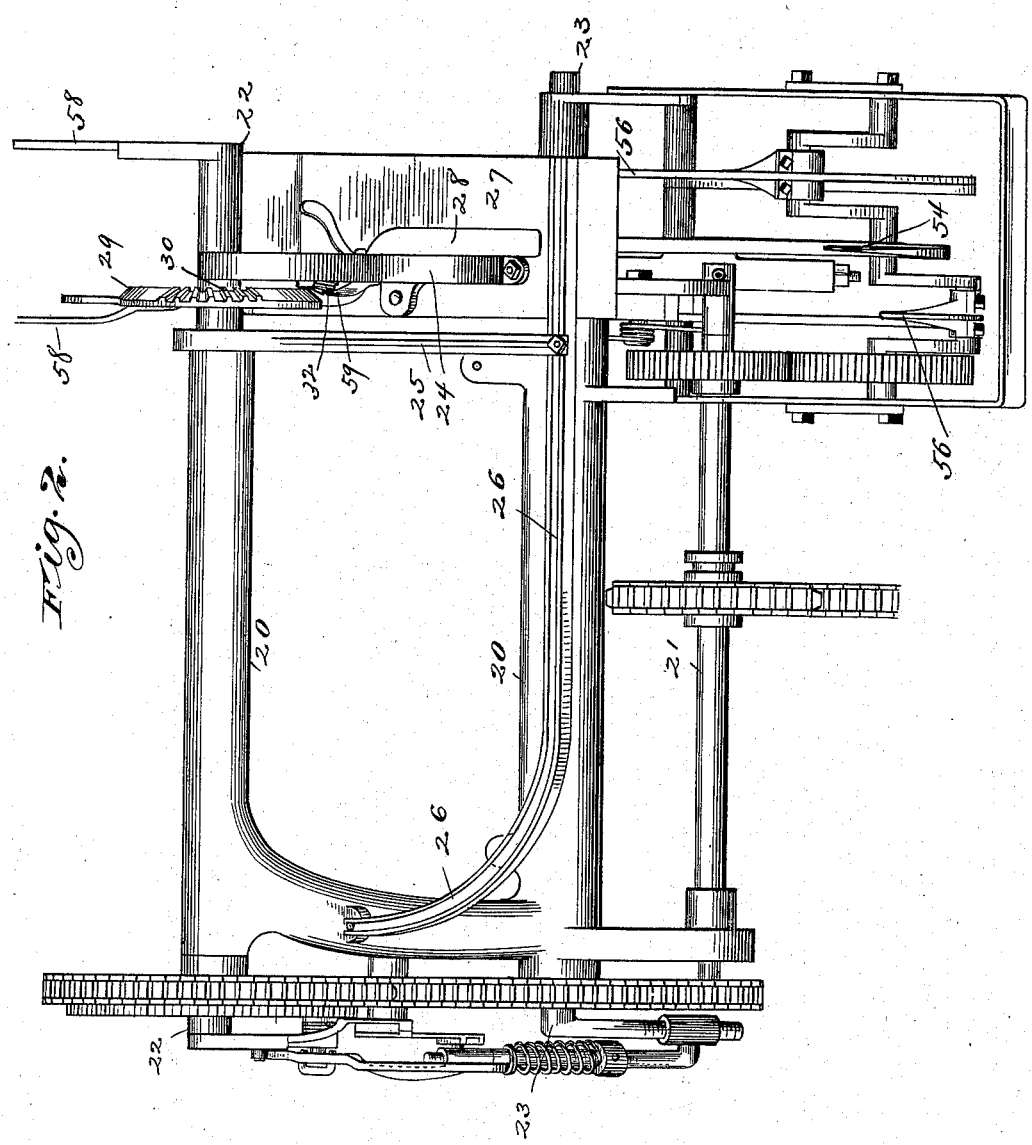
Witnesses,
Inventor,
John F. Appleby
By Offield, Towle & Linthicum
Attys.

(No Model.) 4 Sheets—Sheet 3.
J. F. APPLEBY.
KNOTTING MECHANISM FOR AUTOMATIC GRAIN BINDERS.
No. 567,932. Patented Sept. 15, 1896.
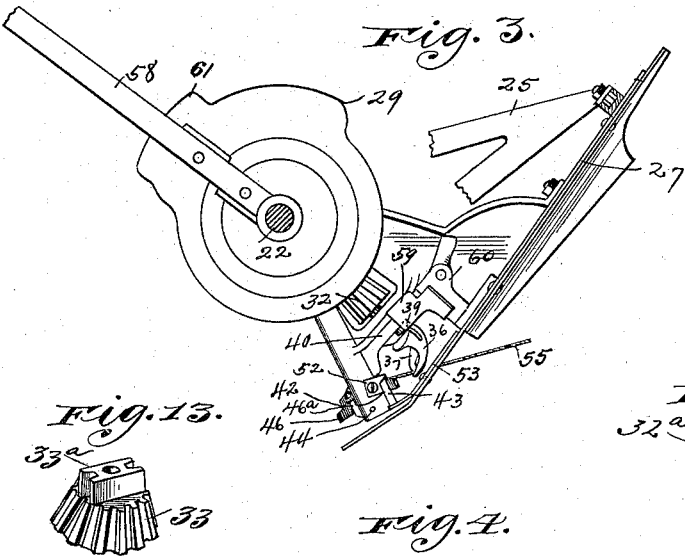
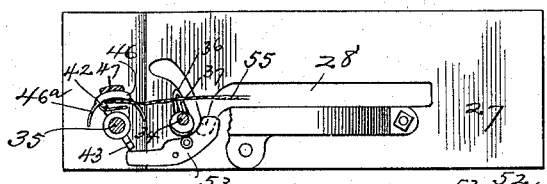
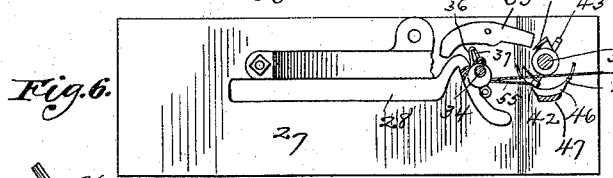
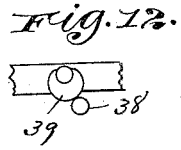
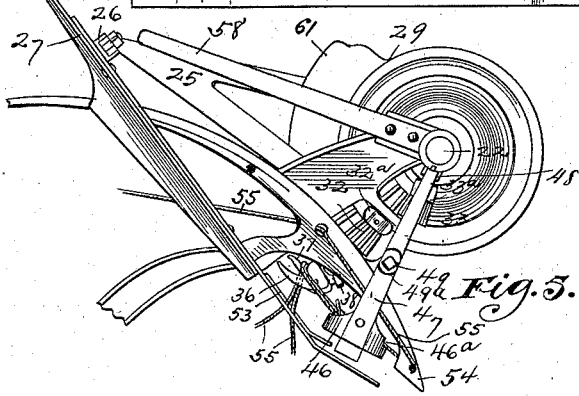
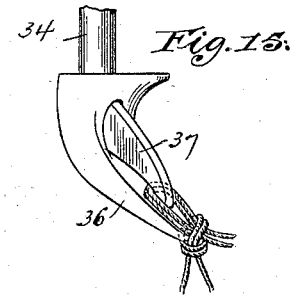
Witnesses, Inventor;

(No Model.) 4 Sheets—Sheet 4.
J. F. APPLEBY.
KNOTTING MECHANISM FOR AUTOMATIC GRAIN BINDERS.
No. 567,932. Patented Sept. 15, 1896.
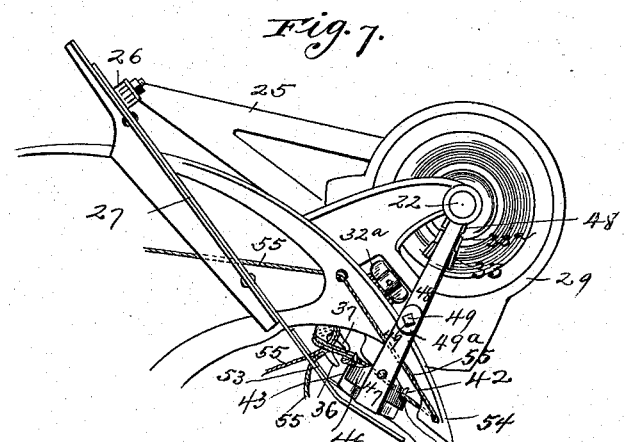
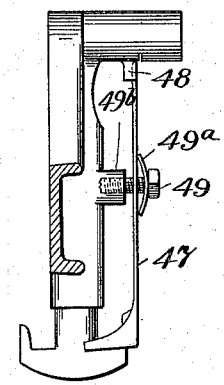
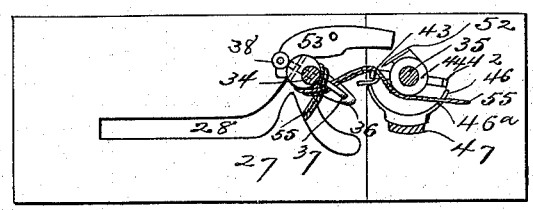
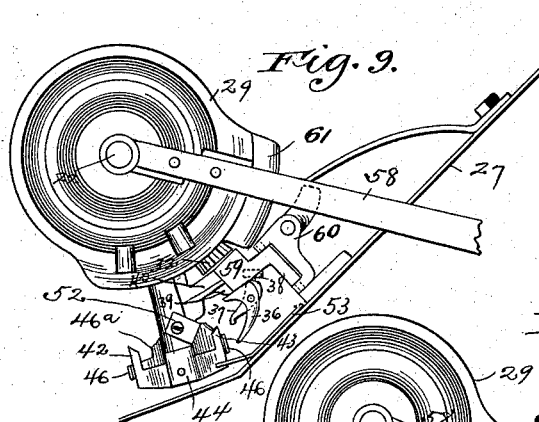
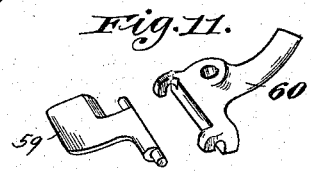
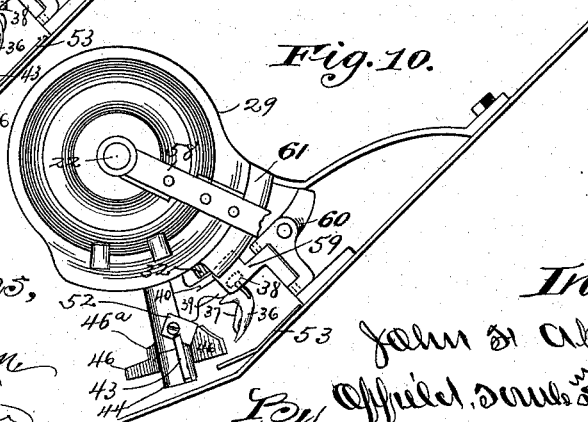
Witnesses,
Inventor,
John F. Appleby

UNITED STATES PATENT OFFICE.

JOHN F. APPLEBY, OF CHICAGO, ILLINOIS, ASSIGNOR, BY MESNE ASSIGNMENTS, TO THE HARVESTER KING COMPANY, OF HARVEY, ILLINOIS.

KNOTTING MECHANISM FOR AUTOMATIC GRAIN-BINDERS.

SPECIFICATION forming part of Letters Patent No. 567,932, dated September 15, 1896.

Application filed March 7, 1894. Serial No. 502,656. (No model.)

*To all whom it may concern:*

Be it known that I, JOHN F. APPLEBY, of Chicago, Illinois, have invented certain new and useful Improvements in Knotting Mechanism for Automatic Grain-Binders, of which the following is a specification.

The subject-matter of this invention is certain improvements in the knotting mechanism of automatic grain-binders, and said knotting mechanism is applicable to any self-binder of the Appleby type.

I have illustrated in the drawings accompanying this application only so much and such parts of the binder as are necessary to an understanding of my present improvements, which relate only to the knotter.

The principal features of the present improvements relate:

First. To a cord-holder which is so constructed as to engage the leading end of the cord, hold it tightly, and carry it to the knotting-hook. The holder serves the further purpose of pressing the cord against the knife in order to sever it after the knot is tied. This cord-holder is so constructed that the cord is not subjected to any undue tension, as in previous constructions, and therefore breaking of the cord is obviated. It also permits the cord to slip sufficiently to supply the quantity demanded by the cord-holder in excess of the feed.

Second. To a novel construction of the cord-severing mechanism, said mechanism comprising, as coacting elements, a stationary knife and a rotating cord-holder having an arm which holds the leading end of the cord and delivers it to the knotting-hook, and thereafter presses the other strand of the cord against the knife and severs it. The action of the severing mechanism is such that no short ends are left in the machine and only one strand of the cord is severed in the formation of the knot.

Third. To a novel means for preventing the cord from passing below the knotting-hook, which would result in the missing of the knot, said mechanism comprising a pivoted plate or guard to close the slot in the breastplate through which the needle works, and which is moved in one direction by the cord-holder to cover the slot and in the other by the cord itself to uncover the slot.

Fourth. To certain other features of construction and combinations of parts of the knotter, as hereinafter described, and more particularly pointed out in the claims.

In the accompanying drawings, Figure 1 is an end elevation of the binding mechanism, more particularly intended to show the knotter and its construction. Fig. 2 is a plan view of the same parts shown in Fig. 1. Fig. 3 is an elevation of the knotter from the opposite side to that shown in Fig. 1. Fig. 4 is a sectional plan view taken above the breastplate and showing the cord-holder shaft and the knotter-shaft in section and the cord-holder and knotting-hook in plan. Fig. 5 is a detail in elevation from the same view-point as Fig. 1, but showing the cord-carrying arm or needle at the forward limit of its stroke and in position of delivering the cord to the hook. Fig. 6 is a plan view in the same plane as Fig. 4 and showing like parts, but in different positions, and showing that stage of the operation wherein the pivoted plate has been moved to uncover the slot. Fig. 7 is an elevation similar to Fig. 5, but showing the hook in position to grasp the cord while the holder is in position to press one strand of the cord against the knife and to engage the bight of the cord at the opposite side of the holder. Fig. 7ª is a detail view of the cord-carrier and its adjustable shoe, particularly intended to show the manner of adjusting the shoe. Fig. 8 is a plan view of some of the parts shown in Fig. 7 and in like positions as the latter figure. Figs. 9, 10, and 11 are details particularly intended to show a locking mechanism for the jaws of the knotting-hook. Fig. 12 is a detail showing the cam for opening the jaws of the knotter-hook. Figs. 13 and 14 are detail views of the gears for the cord-holder and knotter, respectively.

In the drawings, 20 represents the binder-frame, which is of substantially U shape with its opening arranged horizontally, and in which are provided bearings for the several shafts and supports for the knotter-frame.

21 represents a counter-shaft from which are intermittently driven the crank-shaft 22 and the needle-shaft 23. The crank-shaft 22 is journaled at one end in the knotter-frame 24, which is also supported from the binder-frame by means of the fork-brace 25 and arm 26.

27 represents the breastplate, and 28 the slot therein.

29 represents a rack-wheel secured to and therefore having intermittent movement with the crank-shaft 22. This rack-wheel has upon one face the rack-segments 30 31, which operate, respectively, the driving-gears 32 33, the former being mounted upon and driving the knotter-shaft 34 and the latter being mounted upon and driving the cord-holder shaft 35. The shafts 34 and 35 are journaled in the knotter-frame, and the knotter-shaft carries upon its lower end the knotter-hook, comprising the jaws 36 37, the former being constructed integral with or rigidly secured to the shaft 34. The movable jaw 37 is pivoted in its fellow and carries upon its shank behind its pivot the antifriction-roller 38, which is adapted to travel upon the cam-surface 39, Fig. 12, said cam being formed on the lower side of the bridge 40, which furnishes one of the bearings for the knotter-shaft. This cam is substantially an eccentric hub, and as the knotter-shaft is revolved and the roller travels upon the high side of the cam the jaws are opened to grasp the cord. The gear 32 is provided with an extended hub $32^a$, having a straight face which travels upon the delay-surface 41 on the side of the rack-wheel, said delay-surface being arranged in the form of a rib concentric to the hub of the rack-wheel, and cut away at the place where the rack-teeth 30 are located. The result of this construction is that when the shaft 22 is rotated and the rack-wheel revolved in making a complete revolution it will at one portion thereof, by reason of the rack-teeth 30, effect a complete revolution of the knotter-shaft, and during the remaining portion of the revolution of the crank-shaft 22 the knotter-shaft will remain at rest, the straight portion of the hub of its gear riding upon the delay-surface 41 of the rack-wheel.

The cord-holder will be best understood from Figs. 3, 4, and 6 of the drawings. On the lower end of the cord-holder shaft 35 is mounted the cord-holder, consisting of the holding-arms 42 43, which are carried by a central hub or body portion 44, the latter being in the present construction bored to receive the end of the shaft 35 and secured thereto by a pin. The arms are arranged, respectively, at opposite sides of the axis of the shaft 35 and parallel thereto. This cord-holder works in conjunction with a curved shoe 46, and the holding-arms sweep in close proximity to the inner wall of the shoe as they are rotated with their shaft. Said shoe has its rear end notched or reduced in width and the cord is delivered over said narrowed portion.

The shoulder $46^a$, formed by cutting away the shoe, provides an abutment against which the cord is doubled or bent around the arm of the cord-holder. This shoe may be curved through an arc concentric to the axis of the shaft of the cord-holder, and it is preferably so mounted as to somewhat tightly grip the cord against the opposing face of the cord-holder arm. The shoe is carried by a slightly elastic arm or plate 47, which, as shown in Fig. $7^a$, is held at its upper end upon a separate bracket 48 and is adapted to be adjusted by a set-screw 49. A concave washer $49^a$ impinges the arm 47, and the set-screw 49 passes through an aperture in the washer and engages threads in a stud $49^b$ on the sleeve of the cord-carrier shaft. By adjusting this screw the grip of the shoe upon the cord may be varied.

The cord-holder is driven by means of the gear 33, (shown in Fig. 13,) which is secured upon the cord-holder shaft 35. Said gear has its teeth adapted to enmesh the rack-teeth 31, and it has an extended hub $33^a$, flattened on its opposite sides, which flattened surfaces are adapted to ride upon the delay-surface 50, which, like the delay-surface 41, is cut away at the point where the rack-teeth 31 are located. The result of this construction is that the cord-holder will be given a half-revolution at each complete revolution of the crank-shaft 22 and of the knotter-shaft and at each actuation of the binding mechanism.

The arms of the holder act alternately to grasp, hold, carry, and deliver the cord to the knotter-hook and to the knife. The knife is marked 52 and is held in a fixed position eccentric to the axis of the cord-holder shaft and inside the path of the arms 42 43.

53 represents a plate or latch pivoted on the breastplate 27, the pivoted plate or latch being adapted to pass over the apex of the offset or angular portion of the slot and to ride above the projecting tongue or lip of the plate defining one of the walls of said slot. This latch has its heel arranged in position to be engaged by the cord-carrying arms successively as they are rotated in delivering the cord to the knotting hook and knife. In Fig. 4 the latch is shown engaged by the cord-holding arm in position to close the slot and to prevent the cord from passing below the hook. The latch is held in this position until after the jaws of the hook have closed upon the cord, and then the holding-arm being carried beyond the end of the latch the cord, drawing down through the slot, forces the latch back out of the way, and as the knot is completed passes down into the lower portion of the slot.

The needle or cord-carrying arm is marked 54, and it is carried upon the needle-shaft 23. The cord is marked 55 and is led off from the ball or spool and threaded through the eyes of the needle in the usual manner, one of the eyes being at the point and the other in the rear of the point. The packers are marked 56, the compressor-arm 57, and the discharge-arms 58, and in the present construction one of the discharge-arms is shown as mounted upon the rack-wheel which drives the knotting mechanism.

I have above described the mechanism for positively opening the jaws of the knotter-hook at the proper time to grasp the cord, and it remains to describe the mechanism for closing said jaws upon the cord and for holding them closed until the knot is tied and stripped off the knotting-hook in the discharge of the bundle.

The mechanism is shown in Figs. 9, 10, and 11, and consists of the hinged cam 59, which is articulated with the fixed plate 60, carried by the knotter-frame. Said hinged cam 59 is located outside of the path of the roller 38 on the hinged jaw of the knotting-hook, and is forced into contact with said roller at the proper time to close the jaws by the wiping thereover of the peripheral flange 61 of the rack-wheel 29.

The operation of the knotter may now be understood. Let it be assumed that the gavel is gathered and held within the grasp of the packers and compressor, and that the binding mechanism has been put in motion because of the accumulation of the gavel in the receptacle. Thereupon the needle is advanced, separating the flowing grain from the gavel and carrying the cord around the gavel delivers its leading end into the notch of the shoe, while both of the strands of the loop which pass around the bundle rest above and within reach of the hook. The gearing is preferably so timed that the hook will begin its tying movement before the cord-holder commences its revolution, and this for the reason that during the initial movement of the hook the cord slips from the point of the hook (which usually droops) toward its heel, and consequently does not require to be supplied or fed with cord. Now, as the revolution of the hook proceeds from this point, both strands of the cord are flexed and the revolution of the cord-holder sets in, thus feeding forward the held end of the cord toward the hook, while the running strand of the cord is drawn through the needle under proper tension from the supply. As the knotting-hook completes about three-fifths of a revolution from its starting-point, the roller on its hinged jaw encounters the cam or eccentric hub, thus opening the jaws, and they are held in the open position until the hook approaches the completion of its revolution, whereupon its jaws embrace both strands of the cord, which are then looped around both jaws of the hook and across each other. At this point the roller on the hinged jaw of the hook passes beneath the hinged cam and the jaw of the hook is closed upon the strands of the cord, preparatory to pulling the strands through the loop from around the hook. As the movement continues the hinged cam is engaged by the flange of the rack-wheel, thus tightly closing and holding the hinged jaw of the hook while the hook completes its revolution. The discharge-arms engage the gavel, pressing it downward and pulling upon the cord, thus stripping the loop toward the point of the hook, while the strands engaged between its jaws are held until the loop leaves the point of the hook and is drawn tightly by the discharging-gavel around such strands and the knot completed.

It will be understood that the cord-holder is so timed that simultaneous with the closing of the hook upon the strands of the cord in forming the knot the running strand of the cord is presented by the arm of the holder against the knife and the held end of the cord is discharged from the shoe, and simultaneously with this action the opposite arm of the holder impinges the leading end of the cord near the eye of the needle against the opposite end of the shoe.

It will be understood that in the construction above described the axis of rotation of the cord-holder is at one side of the axis of the knotter-hook, and this enables the cord-holder and knotter-hook to be mounted each upon its own driving-shaft, which possesses many advantages.

It will also be observed that in operation the cord is engaged by the holder at the farthest point from the knotter-hook and is carried by the holder toward the hook, being delivered thereto in such manner as to at all times prevent any strain or undue tension which would or might result in breaking the cord. The cord is doubled around the upright arm of the cord-holder, the free end of the cord projecting toward the knotter-hook, as shown in Fig. 4. The cord is therefore held sufficiently tight to insure its being carried forward with the holding-arm, but if the knotting-hook requires cord faster than it is supplied by the forward movement of the holder the free end is pulled around the arm, slipping thereon. This is a very important feature, because it is undesirable to supply the cord faster than it is demanded by the knotter, as the slack would then be in the loop around the bundle, which would thus be imperfectly or loosely bound. Again, if no provision was made for supplying cord from the holder to the knotter-hook except by the forward movement of the former, the cord would be under such great tension as frequently to break it. By my construction the cord is rendered just as needed.

It will be understood that the pivoted latch might be used in connection with other forms of cord-holder, and that it might be opened by other means than by the engagement therewith of the cord-holder.

I claim—

1. A cord-holder for the knotting mechanism of self-binding harvesters, comprising in combination a revoluble shaft, a cross-head secured thereto and having at its outer ends upwardly-extended arms parallel to the axis of rotation and on opposite sides of said shaft, a segmental shoe arranged concentric to the axis of rotation and its ends terminating substantially in the plane passing vertically through the axis of the knotter-hook and cord-holder, and said arms being adapted when the shaft is revolved to engage the cord at a point in the circuit farthest from the knotter and to carry it toward the knotter while permitting the cord to yield by slipping around the arm as required, substantially as described.

2. In a knotting mechanism for self-binding harvesters, the combination of a knotter-hook, a cord-holder arranged at one side of the hook, said cord-holder comprising a revoluble shaft or spindle carrying upstanding arms on opposite sides of said spindle, a shoe arranged concentric to the axis of rotation of the shaft and the arms carried thereby, and a fixed knife located inside the circular path of said arms, the arms being adapted to carry one strand of the cord to the knotter-hook and subsequently to the knife whereby said single strand is severed, substantially as described.

3. A cord-holder for the knotting mechanism of self-binding harvesters, comprising in combination a revoluble shaft, a cross-head secured thereto and having at its outer ends upwardly-extended arms parallel to the axis of rotation and on opposite sides of said shaft, a segmental shoe arranged concentric to the axis of rotation and its ends terminating substantially in the plane passing vertically through the axis of the knotter-hook and cord-holder, said shoe having its end farthest from the knotter-hook narrowed or reduced in width and on which narrowed portion the cord is laid by the needle and the arms being adapted when the shaft is revolved to engage the portion of the cord lying on said narrowed portion and to carry it toward the knotter while permitting the cord to yield by slipping around the arm as required, substantially as described.

4. In a knotting mechanism for self-binding harvesters, the combination with a slotted breastplate, of a latch pivotally mounted on the breastplate, a rotating cord-holder adapted to engage the latch during its rotation and move it into a position to cover the slot while the knotting mechanism is at rest, and a rotating knotter-hook adapted by its rotation to carry the cord against the latch whereby to move it to uncover the slot, substantially as described.

JOHN F. APPLEBY.

Witnesses:
W. H. RIDENOUR,
ARTHUR H. CRAVER.